(12) United States Patent
Westerinen et al.

(10) Patent No.: US 7,765,241 B2
(45) Date of Patent: Jul. 27, 2010

(54) DESCRIBING EXPECTED ENTITY RELATIONSHIPS IN A MODEL

(75) Inventors: Andrea Rose Westerinen, Issaquah, WA (US); Nigel Graham Cain, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 494 days.

(21) Appl. No.: 11/738,194

(22) Filed: Apr. 20, 2007

(65) Prior Publication Data

US 2008/0263085 A1    Oct. 23, 2008

(51) Int. Cl.
*G06F 7/00*    (2006.01)
*G06F 17/30*    (2006.01)

(52) U.S. Cl. ..................................................... 707/803
(58) Field of Classification Search ................. 707/803, 707/E17.048
See application file for complete search history.

(56) References Cited

U.S. PATENT DOCUMENTS

| | | | |
|---|---|---|---|
| 6,675,355 B1 | 1/2004 | Demopoulos | |
| 6,704,776 B1 * | 3/2004 | Fortune | 709/219 |
| 6,711,585 B1 | 3/2004 | Copperman et al. | |
| 6,826,568 B2 | 11/2004 | Bernstein et al. | |
| 6,859,217 B2 | 2/2005 | Robertson et al. | |
| 7,043,487 B2 | 5/2006 | Krishnamurthy et al. | |
| 7,089,533 B2 | 8/2006 | Vosburgh | |
| 7,096,224 B2 | 8/2006 | Murthy et al. | |
| 7,099,885 B2 | 8/2006 | Hellman et al. | |
| 7,120,618 B2 | 10/2006 | Ramani et al. | |
| 7,134,072 B1 | 11/2006 | Lovett | |
| 7,181,438 B1 | 2/2007 | Szabo | |
| 7,266,548 B2 | 9/2007 | Weare | |
| 7,617,160 B1 | 11/2009 | Grove et al. | |
| 2002/0091990 A1 * | 7/2002 | Little et al. | 717/105 |
| 2003/0053106 A1 | 3/2003 | Kuroda et al. | |
| 2003/0149934 A1 * | 8/2003 | Worden | 715/513 |
| 2003/0204481 A1 * | 10/2003 | Lau | 707/1 |
| 2004/0148367 A1 | 7/2004 | Takano et al. | |
| 2004/0158455 A1 * | 8/2004 | Spivack et al. | 704/9 |
| 2004/0230572 A1 | 11/2004 | Omoigui | |

(Continued)

FOREIGN PATENT DOCUMENTS

JP    2006243929 A    9/2006

(Continued)

OTHER PUBLICATIONS

International Search Report and Written Opinion, Application No. PCT/US2008/051721, dated Jun. 20, 2008.

(Continued)

*Primary Examiner*—Khanh B Pham
*Assistant Examiner*—Van H Oberly
(74) *Attorney, Agent, or Firm*—Senniger Powers LLP

(57) ABSTRACT

Defining target data types within an instance of a target data type definition for inclusion in a reference data type definition to declare expected entity relationships in a model. The model corresponds to, for example, software, a business process, or an organizational structure. The target data type defines one or more elements with target data. The target data describes entities that are expected to be related to the reference entity according to a predefined entity relationship. The existing reference data type definition is used to declare the expected entity relationships. In an embodiment, the defined target data type includes a tag in an eXtensible Markup Language (XML) document.

20 Claims, 4 Drawing Sheets

U.S. PATENT DOCUMENTS

| | | | |
|---|---|---|---|
| 2004/0261016 A1* | 12/2004 | Glass et al. | 715/512 |
| 2004/0261018 A1 | 12/2004 | Dunne | |
| 2004/0267718 A1 | 12/2004 | Milligan et al. | |
| 2004/0267764 A1* | 12/2004 | Rothman et al. | 707/100 |
| 2005/0050069 A1 | 3/2005 | Vaschillo et al. | |
| 2005/0149484 A1 | 7/2005 | Fox et al. | |
| 2005/0278310 A1 | 12/2005 | Abrams et al. | |
| 2006/0010369 A1 | 1/2006 | Naundorf et al. | |
| 2006/0053151 A1 | 3/2006 | Gardner et al. | |
| 2006/0173868 A1 | 8/2006 | Angele et al. | |
| 2007/0011193 A1 | 1/2007 | Coker | |
| 2007/0027861 A1 | 2/2007 | Huentelman et al. | |
| 2007/0055680 A1 | 3/2007 | Statchuk | |

FOREIGN PATENT DOCUMENTS

| | | | |
|---|---|---|---|
| KR | 20020042939 A | 6/2002 | |
| WO | 2004046963 A1 | 6/2004 | |

OTHER PUBLICATIONS

Amann et al., "Ontology-Based Integration of XML Web Resources," 1999, 15 pages, Springer-Verlag, France.

Unknown, "Common Information Model (CIM) Standards," 2007, 2 pages, Distributed Management Task Force, Inc., USA.

Erdmann et al., "How to Structure and Access XML Documents with Ontologies," Apr. 2000, 21 pages, Universtat Karlsruhe, Germany.

Lee et al., "Designing Functional Dependencies for XML," 18 pages, National University of Singapore, 2002, Singapore.

Feng et al., "A Semantic Network-Based Design Methodology for XML Documents," Oct. 2002, pp. 390-421, ACM Transactions on Information Systems, vol. 20, No. 4, ACM Press, USA.

Unknown, Application Schema, CIM V2.14, 8 pages, Distributed Management Task Force, Inc., 2007, USA.

International Search Report and Written Opinion, International Application No. PCT/US2008/057746, dated Aug. 21, 2008, 11 pages.

* cited by examiner

FIG. 4

```
<xs:complexType name="RackType">
  <xs:annotation>
    <xs:appinfo>
      <core:ExpectedTargets>
        <core:TargetDetails core:referenceQName="core:ChildRef">
          <core:TargetQName>ChassisType</core:TargetQName>
          <core:TargetQName expectedNumber="1">KeyboardType</core:TargetQName>
          <core:TargetQName expectedNumber="1">MonitorType</core:TargetQName>
        </core:TargetDetails>
        <core:TargetDetails core:referenceQName="core:RequiredElementRef">
          <core:TargetQName expectedNumber="1">PowerSourceType</core:TargetQName>
        </core:TargetDetails>
      </core:ExpectedTargets>
    </xs:appinfo>
  </xs:annotation>
  ...
</xs:complexType>
```

502

DESCRIBING EXPECTED ENTITY RELATIONSHIPS IN A MODEL

BACKGROUND

Software and non-software systems such as business processes and organizational structures may be modeled using currently available modeling languages. There are numerous general-purpose modeling languages that include a graphical notation to create an abstract model of the systems. The models may be serialized using markup languages such as the eXtensible Markup Language (XML), the Unified Modeling Language (UML), the Standard Generalized Markup Language (SGML), or the like.

The abstract model may be viewed graphically by a user, or interpreted by software tools to determine the relationships between entities. For example, an asset manager program may access a model describing the hardware and software assets in a corporation to manage the configuration of the assets.

When defining general models and ontologies, the user creates common types of entities and the relationships that connect the entities in the model. When defining leaf entities in the model, the user may want to highlight (e.g., for tooling and applications) specific general relationships that may exist among the entities. Some examples of general relationships are dependency and composition. In existing approaches, the relationships are defined by subtyping an existing relationship entity in the model and specifically restricting the referenced entities as targets within the subtype. With this approach, however, the representation of the model quickly becomes cluttered with numerous subtyped entities that add no semantics (e.g., no change in multiplicity, and no addition of properties or attributes other than to restrict the referenced entity). In addition, both the general and specifically highlighted relationships between the entities must be retained in the model. The existing approaches to declaring relationships among entities in a model result in highly complex, cluttered models that are difficult to interpret and that add no semantics to the model.

Rather than declaring the expected targets in the model, another existing approach is to update each application that interprets models with the information about expected targets of general relationships. With this approach, however, each application has to be updated each time there is a change to the expected targets.

SUMMARY

Embodiments of the invention describe expected entity relationships in a model representing objects in a system. In an embodiment, the invention includes the explicit declaration of expected, but not required, relationships between the entities in the model. Existing data type definitions for entities in the model are reused and not specialized. A target data type is defined to include data about entities expected to be related to a reference entity, and by what relationships. Instances of the target data type definition are included within the data type definition of the reference entity to relate the expected target entities with the reference entity.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 4 is an exemplary embodiment of an XML schema having expected target data embedded within another data type definition.

Corresponding reference characters indicate corresponding parts throughout the drawings.

DETAILED DESCRIPTION

Embodiments of the invention are directed to explicitly declaring expected relationships in a model of objects or processes as represented by a schema type declaration. This information is useful for tooling and applications to optimize their performance and display. For example, a model represents a rack and its hardware components and dependencies. An entity (e.g., a basic entity or other reference entity) corresponding to the rack is represented by a class definition in the Unified Modeling Language (UML) or an element definition in the eXtensible Markup Language (XML). This entity may have several expected, but not required, relationships between itself and other basic entities. For example, the rack may be dependent on an external cooling component. Rather than subtyping a dependency relationship entity to specialize it for the rack and cooling component, the expected relationships are suggested in the definition of the basic entity (e.g., as metadata). This approach conveys the expected relationships without cluttering and confusing the model.

The model may be serialized or otherwise represented by a markup language such as XML. While some aspects of the invention are described herein with reference to XML, aspects of the invention are operable with any form of text-based markup language or UML-based graphical rendering.

The expected relationships appear in the markup language serialization of the model. For example, an instance of the <ExpectedTargets> element is located within, for example, the <xs:appinfo> tags (e.g., within the <xs:annotation> tags) of a type or element declaration. Using this approach, the expected relationships are declared within the type or element declaration while the general relationships are used directly without redefinition.

Figure 1:
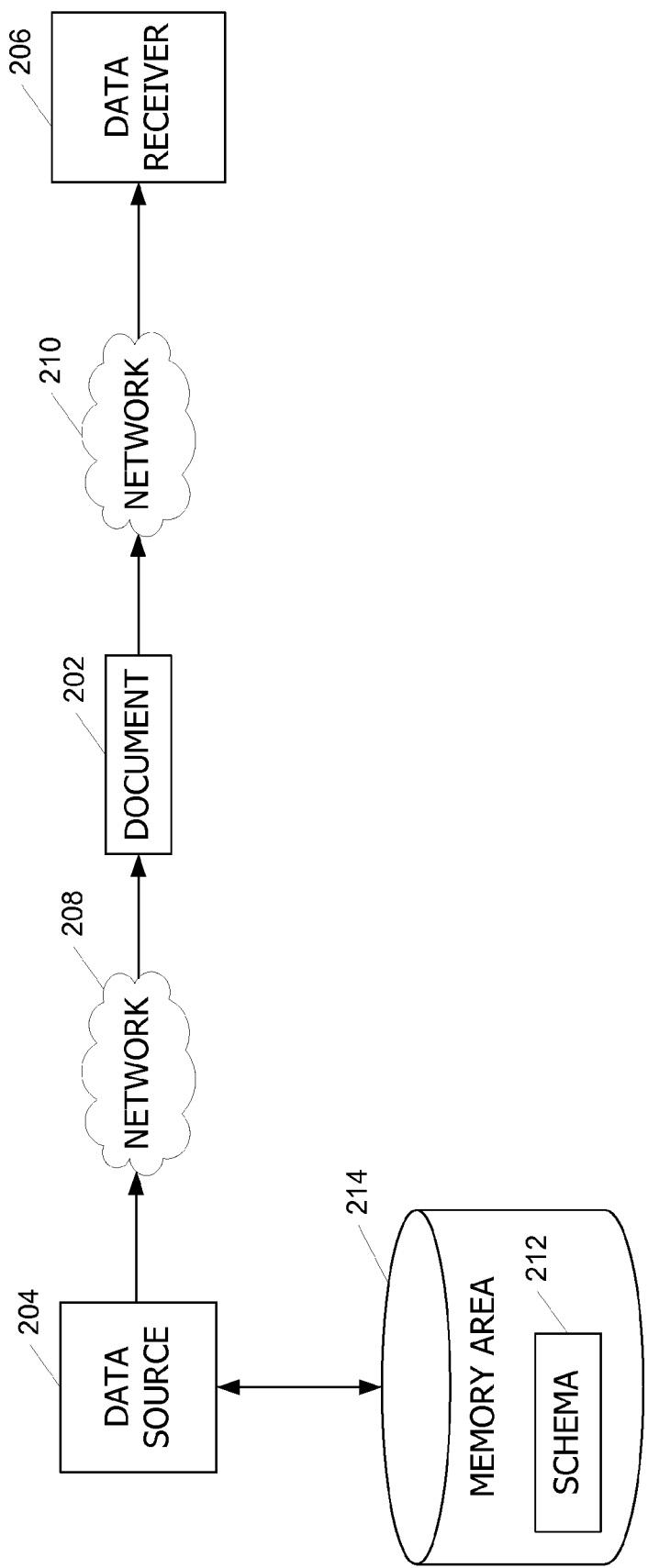
FIG. 1 is an exemplary block diagram illustrating transfer of a markup language document from a data source to a data receiver.

Referring next to FIG. 1, an exemplary block diagram illustrates transfer of a document 202 from a data source 204 to a data receiver 206 over one or more networks 208, 210. In other embodiments, one or more of the networks 208, 210 are absent. The document 202 may be a meta-language document, a markup language document, a meta-markup language document, a tag-based language document, or other graphical or text-based model description.

Markup languages provide a uniform method for exchanging data in an open, text-based format. Markup languages include a set of codes (e.g., tags) conveying data to enable documents such as document 202 and other files to be platform-independent and highly portable between applications. Elements in a markup language are structural constructs that include a start tag, an end or close tag, and information, content, or other data included between or within the tags. A start tag is formatted as <tagname> and an end tag is formatted as </tagname>. In document 202, start and end tags may be nested within other start and end tags. Each element forms a node in this structure, and potentially has child, leaf, or branch nodes. The child nodes represent any elements that occur between the start and end tags of the parent node.

The structure of the document 202 is defined by a schema 212, schema document, or similar structure. The schema 212 defines the legal building blocks of the document including element declarations, child elements, attributes, data types, data values for the elements, default and fixed values for elements and attributes, and other properties and values. For example, standard data types such as strings, dates, date times, durations, time zones, decimals, numerical values, integers, and the like may be used in a schema within type declarations.

While markup languages support various standard data types, further data types (e.g., both simple and complex data types) may be defined by the programmer in the schema. To use a data type, an element of that type is declared in the document 202 and then instantiated. Instantiations of elements of given data types may be assigned values when created and may subsequently be updated or removed.

In the example of FIG. 1, the data source 204 provides data to a data receiver 206. The data is embedded in the document 202. Document 202 is formatted in accordance with standardized markup language syntax, and also conforms to the schema 212. Data receiver 206 parses and interprets data in the document 202 with reference to schema 212. The schema 212 corresponds to a model representing objects in a system.

Data receiver 206 receives document 202 and while parsing and interpreting the document 202 may encounter one or more instances of elements defined within the document 202 or in the schema 212. In general, data receiver 206 references the schema 212 to identify data elements and type definitions corresponding to the encountered instances. If data receiver 206 finds that the elements are not defined or otherwise specified in schema 212, the data receiver 206 may show an error. If the document element is found in schema 212, the data receiver 206 uses information obtained from the schema 212 while parsing or interpreting the document 202.

While schema 212 is shown to be stored in a memory area 214 accessible by or associated with data source 204, the schema 212 or a copy thereof is also accessibly by the data receiver 206 (e.g., stored in a memory area accessible by the data receiver 206).

Aspects of the invention may be implemented with a general purpose computing device in the form of a computer. Generally, the data processors of the computer are programmed by means of instructions stored at different times in the various computer-readable storage media of the computer. Embodiments of the invention may be described and implemented in the general context of computer-executable instructions, such as program modules, executed by one or more computers or other devices. The computing device has access to or is associated with a computer-readable media such as a memory area 214 storing, for example, the schema 212. Computer readable media, which include both volatile and nonvolatile media, removable and non-removable media, may be any available medium that may be accessed by the service. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the computing device. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

Figure 2:
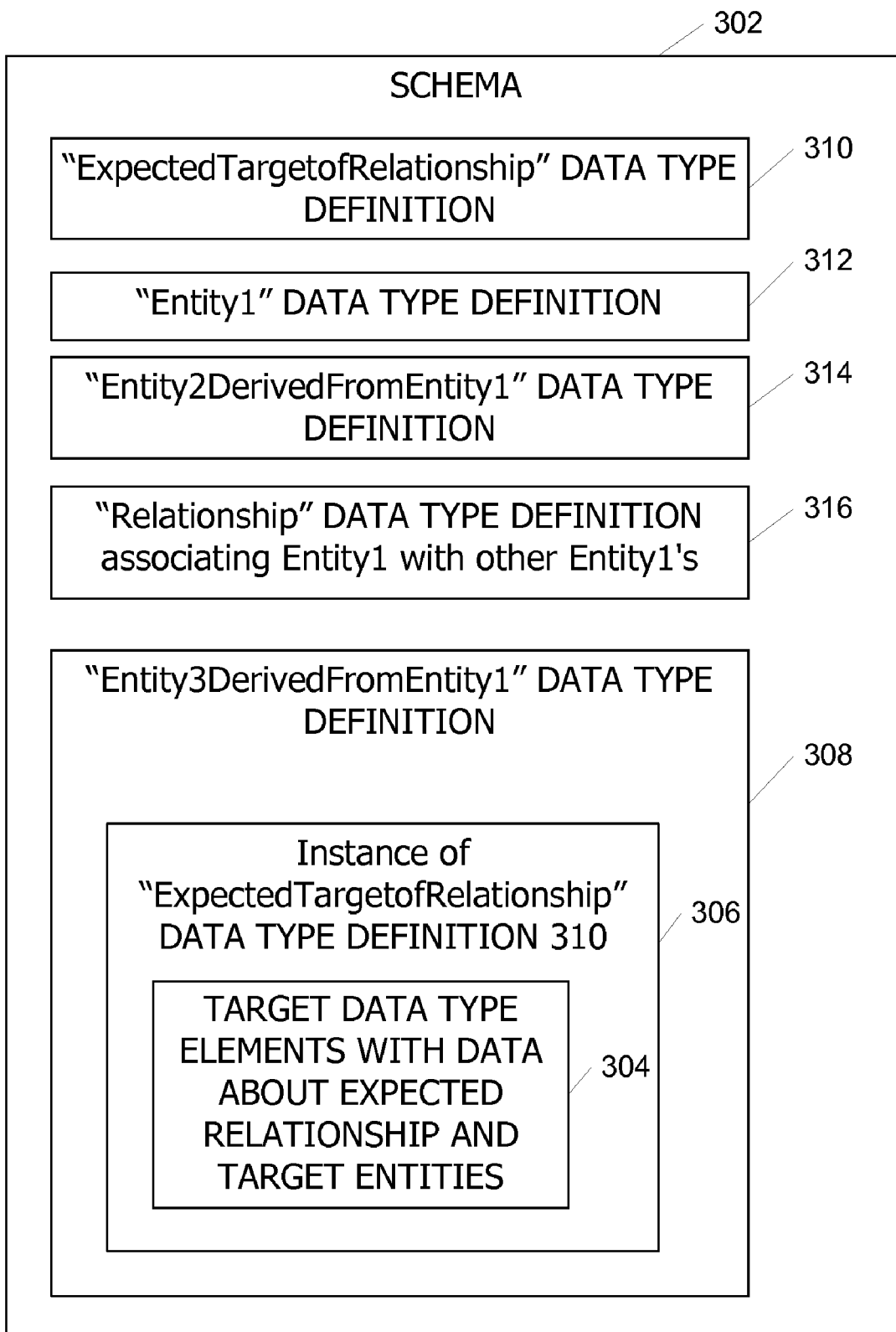
FIG. 2 is an exemplary block diagram illustrating a schema having an instance of a target data type definition embedded within the data type definition of a reference entity.

Referring next to FIG. 2, a block diagram illustrates an exemplary schema 302. The exemplary schema 302 includes several data type definitions including an ExpectedTargetofRelationship data type definition 310 (e.g., a target data type definition), an Entity1 data type definition 312, an Entity2DerivedFromEntity1 data type definition 314, a Relationship data type definition 316, and an Entity3DerivedFromEntity1 data type definition 308 (e.g., a reference data type definition). The Entity3DerivedFromEntity1 data type definition 308 includes an instance 306 of the ExpectedTargetofRelationship data type definition 310. Instance 306 includes target data type elements 304 having data about expected relationships and target entities. The target data type elements 304 include target data (e.g., regarding expected entities and relationships such as a reference to the Relationship data type definition 316) and are of the type defined by the ExpectedTargetofRelationship data type definition 310. The derived entities Entity 2 and Entity 3 represent specializations of Entity 1. For example, entity 1 corresponds to general hardware, Entity 2 corresponds to a chassis, Entity 3 corresponds to a rack, and the Relationship data type definition 316 represents "is contained by."

The instance 306 is located in a well-known or standardized location of the Entity3DerivedFromEntity1 data type definition 308. For example, the instance 306 may be located in elements of the Entity3DerivedFromEntity1 data type definition 308 such as <xs:appInfo> or <xs:annotation>. In general, the <xs:appInfo> and <xs:annotation> elements are standard, available elements within the Entity3DerivedFromEntity1 data type definition 308. Such elements are typically used for application-level documentation of XML code. However, the instance 306 may be stored in any portion of the Entity3DerivedFromEntity1 data type definition 308. Multiple instances may be declared within the <xs:appInfo> and <xs:annotation> elements.

In general, FIG. 1 and FIG. 2 represent a system for utilizing a pre-defined data type definition such as ExpectedTargetofRelationship data type definition 310 in the definition of a basic entity's data type declaration such as Entity3DerivedFromEntity1 data type definition 308. The instance 306 is therefore applicable to all instances of Entity3DerivedFromEntity1 data type definition 308.

An example of an XML definition of the instance 306 is shown below.

```
<xs:element name="ExpectedTargets">
  <xs:annotation>
    <xs:documentation>An element of this type is placed in xs:appinfo, to allow
the definition of the "expected" targets (elements or types) of the general, inherited
references such as dependency or composition. In addition, the expected number of
instances of the reference, to the target, can be indicated (if not specified, there may
be any number of instances). An example would be to indicate that a Rack contains
one or more chassis (i.e., that the ChildRef element is used and expected to reference
multiple instances of ChassisType) and requires a backup power source (i.e., that the
RequiredElementRef element is used and expected to reference one instance of
PowerSourceType).</xs:documentation>
  </xs:annotation>
  <xs:complexType
    <xs:sequence>
      <xs:element name="TargetDetails" type="TargetDetailsType"
minOccurs="0" maxOccurs="unbounded"/>
    </xs:sequence>
  </xs:complexType>
</xs:element>
<xs:complexType name="TargetDetailsType">
  <xs:annotation>
    <xs:documentation>An entity that contains (as child elements) the targets of
the reference defined by the referenceQName attribute. </xs:documentation>
  </xs:annotation>
  <xs:sequence>
    <xs:element name="TargetQName" minOccurs="0"
maxOccurs="unbounded">
      <xs:annotation>
        <xs:documentation>The specific target entity (type or element) and
expectedNumber of references to that entity.</xs:documentation>
      </xs:annotation>
      <xs:complexType>
        <xs:simpleContent>
          <xs:extension base="xs:QName">
            <xs:attribute name="expectedNumber" type="xs:unsignedByte"
use="optional"/>
          </xs:extension>
        </xs:simpleContent>
      </xs:complexType>
    </xs:element>
  </xs:sequence>
  <xs:attribute name="referenceQName" type="xs:QName" use="required"/>
</xs:complexType>
```

In the above example of the instance 306, the referenceQName corresponds to the Relationship data type definition 316.

In general, the schema 302 is represented as a data structure stored on a computer-readable medium. Aspects of the invention include or are operable with data structures having any quantity and ordering of fields therein. In an embodiment, the exemplary data structure in FIG. 2 comprises a first field for storing the Entity3DerivedFromEntity1 data type definition 308. The Entity3DerivedFromEntity1 data type definition 308 corresponds to a basic entity in the object model. A well-known location, within the Entity3DerivedFromEntity1 data type definition 308, stores an instance 306 of the ExpectedTargetofRelationship data type definition 310 in a second field in the data structure. The instance 306 comprises instances of one or more target data type elements 304 each describing one or more target entities expected to be associated with the basic entity through the specified relationships (e.g., via an instance of the Relationship data type definition 316). A computing device executes computer-executable instructions to instantiate the Entity3DerivedFromEntity1 data type definition 308 and the Relationship data type definition 316 to associate instances of basic entities with data types defined in the target data type elements 304. These instances correspond to the definitions in schema 302.

Figure 3:
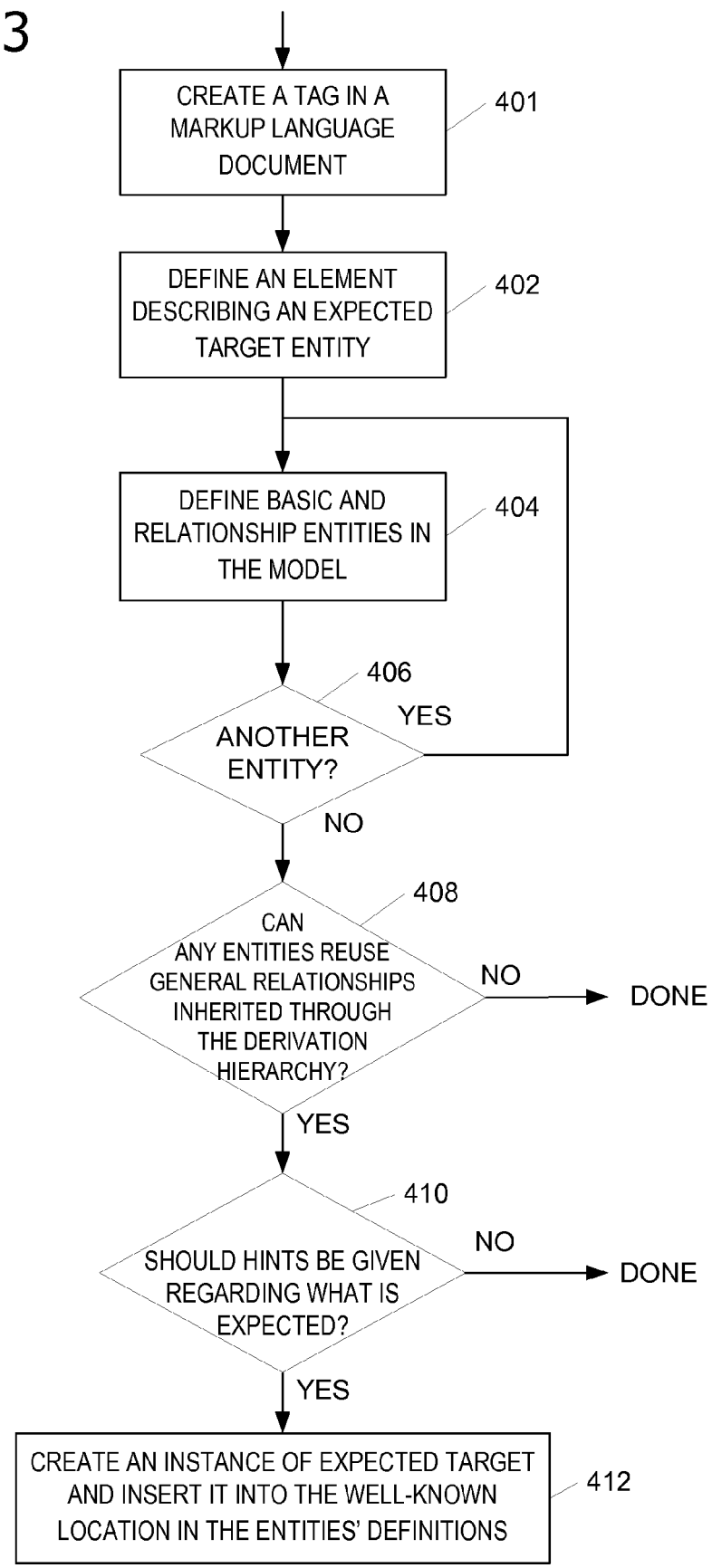
FIG. 3 is an exemplary flow chart illustrating the insertion of expected target data within a reference data type definition.

Referring next to FIG. 3, an exemplary flow chart illustrates the insertion of expected target data within a reference data type definition. In general, an explicit tag is defined for the expected targets of a reference or relationship. The tag and contents are placed in a well-known and standard location within the XML document (e.g., within the xs:annotation section of the XML document). Existing element or type definitions are referenced to specifically define the target elements and types for the general relationships of an entity. There may be an unlimited quantity of references to the target, or the quantity may be specified explicitly in one of the target data type elements.

Referring to FIG. 3, an exemplary flow chart illustrates the insertion of expected target data within a reference data type definition to explicitly declare expected relationships between entities in a model. A tag is created in a markup language document (e.g., a schema type declaration such as in an XML document) at 401. An element describing an expected entity in the model is defined at 402. Basic and relationship entities in the model are defined at 404. For example, an expected quantity of one of the expected entities is defined. If there are additional entities to define at 406, the additional entities are defined at 404. If any of the defined entities cannot re-use general relationships inherited through the derivation hierarchy (e.g., specialization) at 408, then the process in an embodiment of the invention stops. Subtyping of predefined or existing relationships may need to occur to model the entities.

If at least one of the defined entities can re-use the general relationships inherited through the derivation hierarchy at 408 (e.g., predefined or existing relationships), the process continues at 410. Predefined or existing relationships include, for example, "is contained by," "is part of," and "is included in." At 410, if hints should not be given regarding expected entities and relationships, then the process in an embodiment of the invention stops. If hints should be given regarding expected entities and relationships at 410, an instance of the expected target is created and inserted into a well-known location in the entities' definitions at 412.

The operation of the embodiment in FIG. 3 may be implemented by computer-executable instructions organized into one or more computer-executable components stored on one or more computer-readable media. Embodiments of the invention include a processor (not shown) configured to execute the computer-executable instructions. Upon execution, the computer-executable instructions implement aspects of the invention. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

In operation, aspects of the invention include a method of explicitly declaring expected relationships between expected entities and a reference entity in a model. The reference entity has a reference data type definition associated therewith. The method includes:

creating an expected targets tag in a markup language schema type declaration;

defining one or more elements describing one or more expected entities in the model;

identifying a predefined entity relationship;

associating the expected targets tag with the defined elements and the identified, predefined entity relationship; and locating the expected targets tag and associated elements and entity relationship in the reference data type definition of the reference entity to declare a relationship between the expected entities and the reference entity.

By re-using the predefined relationships, there is no need to subtype the predefined relationships.

A method in an embodiment of the invention also includes:

identifying a data type definition from the markup language schema, said data type definition corresponding to a reference entity in the model;

defining one or more elements describing one or more entities expected to be associated with the reference entity;

identifying predefined entity relationships for use in associating the expected entities with the reference entity, said expected entities having a target data type definition associated therewith, said reference entity having a reference data type definition associated therewith;

associating the defined elements and the defined relationships with a tag;

inserting the tag with the associated elements and relationships into an instance of the target data type definition; and locating the instance of the target data type definition in the reference data type definition to relate the expected entities with the reference entity in the model.

Referring next to FIG. 4, an exemplary embodiment of an XML schema has an instance of expected target data embedded within a data type definition. In the example of FIG. 4, the schema developer calls out what is expected to be inserted in a rack as well as the expected dependencies of the rack. This allows applications or tools to be customized for these expected elements. The rack typically contains one or more chassis, and likely not more than one monitor or keyboards (e.g., as instances of the "ChildRef" reference). In addition, the rack depends on a backup power source as an instance of the "RequiredElementRef" reference. The rack is declared as shown in FIG. 4.

In FIG. 4, the ChildRef reference corresponds to the Relationship data type definition 316 in FIG. 2. The RackType corresponds to the Entity3DerivedFromEntity1 data type definition 308 in FIG. 2. The ExpectedTargets corresponds to the instance 306 of "ExpectedTargetofRelationship" data type definition in FIG. 2. The ChassisType corresponds to Entity2DerivedFromEntity1 data type definition 314 in FIG. 2.

The computer-executable instructions and components described herein constitute exemplary means for re-using a pre-defined data type definition associated with a reference entity to define target data types describing relationships of the reference entity. The targets of various generic relationships of the reference entity are highlighted within the declaration of the reference entity. The computer-executable instructions and components described herein further constitute exemplary means for defining one or more elements describing one or more entities expected to be associated with the reference entity.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, a computer executes computer-executable instructions such as those illustrated in the figures and described herein to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having"

are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of explicitly declaring expected relationships between expected entities and a reference entity in a model, said reference entity have a reference data type definition associated therewith, said method comprising:

creating an expected targets tag in a markup language schema type declaration in the model;

defining one or more elements describing one or more expected entities according to the created expected targets tag in the model;

identifying a predefined entity relationship, said described one or more expected entities being expected entities based on the predefined entity relationship and are not required entities based on the predefined entity relationship;

associating the expected targets tag with the defined one or more elements and the identified, predefined entity relationship;

locating the expected entities in the reference data type definition having the expected targets tag and associated elements and predefined entity relationship; and declaring a relationship between the located expected entities and the reference entity in response to the locating.

2. The method of claim 1, wherein defining the one or more elements comprises defining an element representing an expected quantity of one of the expected entities.

3. The method of claim 1, wherein creating the expected targets tag in the markup language schema type declaration comprises creating the expected targets tag in an eXtensible Markup Language (XML) document.

4. The method of claim 1, wherein locating the expected entities in the reference data type definition comprises embedding the defined elements and the predefined entity relationship within an annotation data type element in the reference data type definition.

5. The method of claim 1, wherein locating the expected entities in the reference data type definition comprises embedding the defined elements and the predefined entity relationship within an appinfo data type element in the reference data type definition.

6. The method of claim 1, wherein the one or more expected entities in the model represent objects in a system.

7. The method of claim 1, wherein creating the expected targets tag comprises creating an <ExpectedTargets> tag.

8. The method of claim 1, further comprising displaying the model in graphical or textual form.

9. The method of claim 1, wherein one or more computer-readable media have computer-executable instructions for performing the method of claim 1.

10. A system for referencing a pre-defined data type definition associated with an entity to define target data types describing relationships of the entity, said system comprising:

a memory area for storing a markup language schema corresponding to a model representing objects in a system; and a processor configured to execute computer-executable instructions for:

identifying a data type definition from the markup language schema, said data type definition corresponding to a reference entity in the model;

defining one or more elements describing one or more entities expected to be associated with the reference entity in the model;

identifying predefined entity relationships for use in associating the expected entities with the reference entity, said expected entities having a target data type definition associated therewith, said reference entity having a reference data type definition associated therewith, said expected entities not being required entities for the target data type definition;

associating the defined elements and the defined relationships with a tag;

inserting the tag with the associated elements and relationships into an instance of the target data type definition in the markup language schema corresponding to the model; and locating the instance of the target data type definition in the reference data type definition to relate the expected entities with the reference entity in the model.

11. The system of claim 10, further comprising means for re-using a pre-defined data type definition associated with an entity to define target data types describing relationships of the entity.

12. The system of claim 10, further comprising means for defining the one or more elements describing the one or more entities expected to be associated with the reference entity.

13. The system of claim 10, wherein the processor is further configured to execute computer-executable instructions for displaying the reference data type definition in the model.

14. The system of claim 10, wherein the memory area stores a markup language schema in a format conforming to the Unified Modeling Language (UML).

15. The system of claim 10, wherein the processor is further configured to execute computer-executable instructions for interpreting the reference data type definition by referring to the markup language schema stored in the memory area.

16. The system of claim 10, wherein the processor is further configured to execute computer-executable instructions for associating target data with the defined one or more elements, wherein the associated target data describes the one or more entities expected to be associated with the reference entity.

17. The system of claim 10, wherein the markup language schema describes a hardware configuration, the reference entity comprises a computing device, and the one or more entities comprise a keyboard and a monitor.

18. A computer-readable medium having stored thereon a data structure representing a system model, said data structure comprising:

a first field for storing a reference data type definition, said reference data type definition corresponding to a reference entity in the system model; and a second field, within the reference data type definition in the first field, for storing an instance of a target data type definition, said instance comprising instances of one or more target data type elements each describing one or more target entities expected to be associated with the reference entity according to predefined entity relationships, said one or more expected target entities not being required according to the predefined entity relations, wherein a computing device executes computer-executable instructions to:

instantiate the reference data type definition stored in the first field;

associate the instantiated reference data type definition with the instance of the target data type definition stored in the second field to relate the reference entity to the expected target entities according to the predefined relationships; and store the instantiated reference data type definition in a markup language document, said markup language document representing the system model.

19. The computer-readable medium of claim 18, wherein the second field is stored within an annotation element of the reference data type definition in the first field.

20. The computer-readable medium of claim 18 wherein the second field is stored within an appinfo element of the reference data type definition in the first field.

* * * * *